(No Model.)
D. LUBIN.
BOTTLE.
No. 264,839. Patented Sept. 19, 1882.
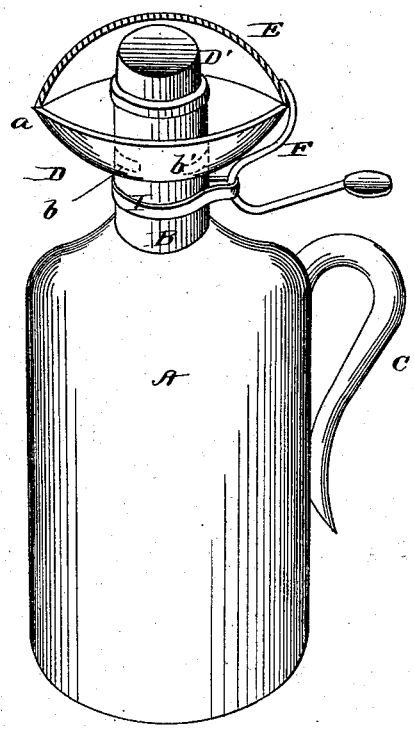
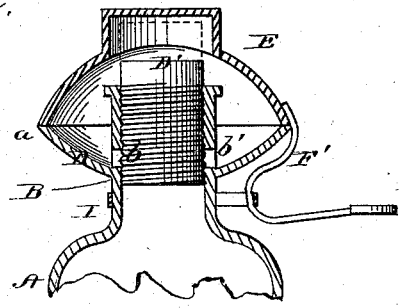
Witnesses,
Edwin L. Yewell
J. J. McCarthy
Inventor,
David Lubin,
By C. M. Alexander
his Attorney.

UNITED STATES PATENT OFFICE.

DAVID LUBIN, OF SACRAMENTO CITY, CALIFORNIA, ASSIGNOR OF ONE-HALF TO HARRIS WEINSTOCK, OF SAME PLACE.

BOTTLE.

SPECIFICATION forming part of Letters Patent No. 264,839, dated September 19, 1882.

Application filed February 28, 1882. (No model.)

*To all whom it may concern:*

Be it known that I, DAVID LUBIN, of Sacramento City, in the county of Sacramento, and in the State of California, have invented certain new and useful Improvements in Bottles; and I do hereby declare that the following is a full, clear, and exact description thereof, reference being had to the accompanying drawings, and to the letters of reference marked thereon, making a part of this specification.

This invention relates to an improvement on jugs which are especially designed for containing molasses and other thick liquids; and the nature of my invention consists in a jug or bottle having a pouring or drip cup formed on its neck and communicating with the interior of the vessel, in combination with a cover for the said cup or funnel, as will be hereinafter explained.

In the annexed drawings, Figure 1 is a perspective view of a jug having my improvement applied to it, indicating the hinged cover in section. Fig. 2 is a diametrical section through the neck and part of the body of the jug having my improvement applied.

A designates the body of the jug; B, the neck thereof, and C a handle.

D is a cup or funnel, which is upwardly flaring and preferably of an elliptical shape, with a pouring-lip, $a$. This cup or funnel is cast or molded with the neck of the jug, and is therefore an integral part of the same. It is located a short distance below the upper end or mouth of the neck B, and it has two passages leading from it into the neck, which passages are lettered $b\ b'$, and they may be arranged diametrically opposite each other, as shown in Fig. 2 of the drawings.

$D'$ designates a stopple, which is inserted into the neck of the jug, and which serves to close the upper end thereof, and also to close the passages $b\ b'$.

E designates the cover, which is adapted to fit snugly on the cup or funnel D for the purpose of excluding dust, insects, &c., therefrom. This cover is secured to a curved thumb-lever, F, which is pivoted to a band, I, that embraces the neck B of the jug.

The lateral passage $b$ is of such size that when the stopple $D'$ is raised, as shown in Fig. 2 in dotted lines, a liquid can be poured from the jug through said passage into the funnel or cup D and discharged from the lip $a$. When the jug is held upright after thus pouring a liquid from it any liquid left in the cup D will flow back into the jug. The passage $b'$ allows air to flow into the jug while pouring a liquid from the jug through the passage $b$ and cup D.

Having described my invention, I claim—

The new article of manufacture, consisting of a jug having a pouring or drip cup, a neck extended above the base of this cup and formed entire with the body of the jug, the perforations $b\ b'$ through the neck, the stopple-valve, and the hinged cover, all combined in the manner shown and described.

In testimony whereof I affix my signature, in presence of two witnesses, this 21st day of February, 1882.

DAVID LUBIN.

Witnesses:
MARTIN M. LEWIS,
CHARLES LEWIS.